(12) United States Patent
Hirata et al.

(10) Patent No.: US 8,416,190 B2
(45) Date of Patent: Apr. 9, 2013

(54) OPERATION DEVICE, INFORMATION PROCESSING SYSTEM, AND INFORMATION PROCESSING METHOD (75) Inventors: Shinichi Hirata, Kanagawa (JP); Hiroshi Osawa, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 12/526,255

(22) PCT Filed: Feb. 20, 2007

(86) PCT No.: PCT/JP2007/053038
§ 371 (c)(1),
(2), (4) Date: Sep. 16, 2009

(87) PCT Pub. No.: WO2008/102432
PCT Pub. Date: Aug. 28, 2008

(65) Prior Publication Data
US 2010/0020013 A1    Jan. 28, 2010

(51) Int. Cl.
*G06F 3/033*    (2006.01)
(52) U.S. Cl. .................................. 345/161; 345/156
(58) Field of Classification Search ........... 345/156–184
See application file for complete search history.

(56) References Cited

U.S. PATENT DOCUMENTS

| | | | |
|---|---|---|---|
| 6,034,624 A | 3/2000 | Goto et al. | |
| 6,552,666 B1 | 4/2003 | Goto et al. | |
| 6,885,310 B2 | 4/2005 | Goto et al. | |
| 7,133,026 B2 | 11/2006 | Horie et al. | |
| 2003/0117377 A1 | 6/2003 | Horie et al. | |

FOREIGN PATENT DOCUMENTS

| | | |
|---|---|---|
| JP | 06-023148 A | 2/1994 |
| JP | 09-016320 A | 1/1997 |
| JP | 09-311762 | 12/1997 |
| JP | 09-311762 A | 12/1997 |
| JP | 2003-140823 | 5/2003 |

OTHER PUBLICATIONS

Japanese Patent Office, "International Search Report," issued in corresponding International Application No. PCT/JP2007/053038, mailed Apr. 17, 2007, 1 page and 1-page English language translation.

Patent Cooperation Treaty; "International Preliminary Report on Patentability" issued in corresponding International App. No. PCT/JP2007/053038; mailed Aug. 26, 2009; 10 pages.

(Continued)

*Primary Examiner* — Kevin M Nguyen
*Assistant Examiner* — Cory Almeida
(74) *Attorney, Agent, or Firm* — Fitch, Even, Tabin & Flannery, LLP (57) ABSTRACT

There is provided an operation device that can be stably operated without taking up a lot of space when tilted by a user during the operation. The operation device includes: a support part (12) formed to be pressable against a supporting object in a state in which the user is holding the operation device; a pressing detection part (13) for detecting a state in which the support part (12) is pressed against the supporting object; and a tilt detection part for detecting a tilt of the operation device. The user changes the tilt of the operation device in a state in which the support part (12) is pressed against the supporting object to thereby implement the operation with respect to a connection apparatus.

12 Claims, 9 Drawing Sheets

OTHER PUBLICATIONS

Patent Cooperation Treaty; "Written Opinion of the International Searching Authority" issued in corresponding International App. No. PCT/JP2007/053038; mailed Apr. 17, 2007; 7 pages.

Chinese Patent Office; "Notice of Rejection" issued in corresponding Chinese Patent Application No. 200780051585.8; Date of Mailing Feb. 1, 2011; 8 pages total, which includes 3 pages of Partial English-language translation.

Japanese Patent Office; Office Action issued in corresponding Japanese Patent Application No. 2009-500029, dated Feb. 14, 2012; 3 pages total, which includes 1 page of partial English-language translation.

OPERATION DEVICE, INFORMATION PROCESSING SYSTEM, AND INFORMATION PROCESSING METHOD

TECHNICAL FIELD

The present invention relates to an operation device that is held and used by a user, an information processing system provided with the operation device, and an information processing method.

BACKGROUND ART

Various types of operation devices are known as an operation device used by a user to give an operation instruction to an information processing device, including a controller for a home-use game machine. These operation devices include an operation device that is held by a user and used in a state in which the operation device is not supported by another object (that is, in a floating state). Further, there is a case in which such an operation device is provided with a function of detecting a tilt of the operation device by means of an acceleration sensor or the like (for example, see Patent Document 1).

Figure 12:
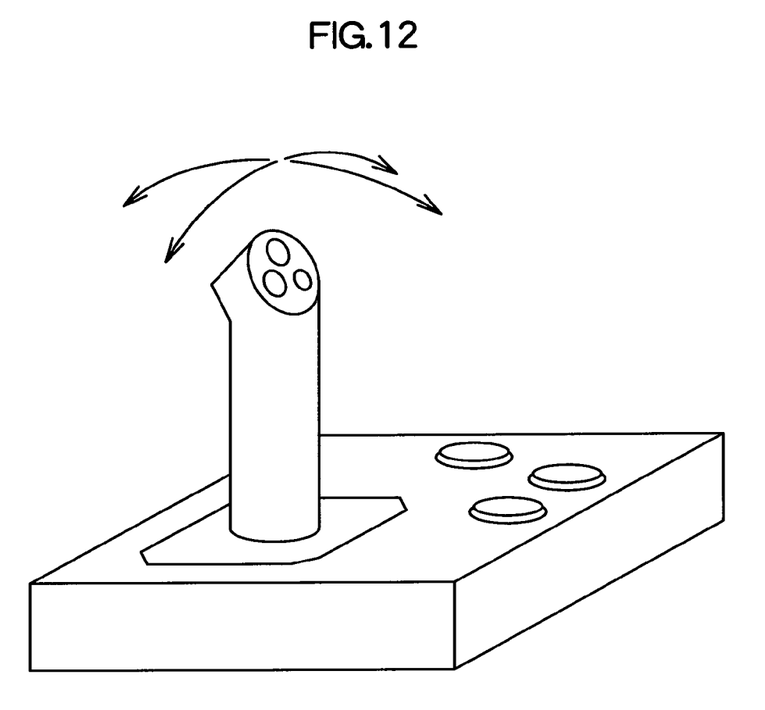
FIG. 12 is an explanatory diagram illustrating an example of an operation device that is placed on a table or the like when used.

On the other hand, there is another operation device that is used in a state in which the operation device is placed on an object having a horizontal plane, such as a table. One example of such an operation device is provided with a stick-like grip part and a base part (see FIG. 12).

Patent Document 1: JP 2003-140823 A

DISCLOSURE OF THE INVENTION

Problem to be Solved by the Invention

For example, in the case of playing a game such as a flight simulator, there are situations where the user desires to give an operation instruction through a motion of tilting the operation device. For such use, if the above-mentioned operation device that is used in a floating state is adopted, due to an unstable position of the operation device, there is a possibility that the user will find it difficult to operate the operation device, or that the user will tire easily. On the other hand, in the case of the operation device that is placed on an object having a horizontal plane when used, the operation device is supported by an object such as a table, and hence the attitude of the operation device is made stable. However, in the case of using such an operation device, a need arises for a reasonably large horizontal plane for the operation device to be placed upon.

The present invention has been made in view of the above-mentioned circumstances, and an object of the present invention is to provide an operation device that can be stably operated without taking up a lot of space when tilted by a user during the operation, an information processing system provided with the operation device, and an information processing method.

Means for Solving the Problems

According to the present invention, an operation device that is held and used by a user includes: a support part formed to be pressable against a supporting object in a state in which the user is holding the operation device; a pressing detection part for detecting a state in which the support part is pressed against the supporting object; and a tilt detection part for detecting a tilt of the operation device. The user changes the tilt of the operation device in a state in which the support part is pressed against the supporting object to thereby implement operation with respect to a connection apparatus.

In the above-mentioned operation device, the support part may be formed in a hemispherical shape. Further, the support part may be axisymmetric with respect to a predetermined reference axis, and may be formed to have a curvature of a surface thereof that varies with an angle with respect to the reference axis.

Further, the above-mentioned operation device may be formed in a manner that enables identification of a reference direction, which serves as a reference for tilt detection performed by the tilt detection part.

Further, in the above-mentioned operation device, the support part may have a surface, which is brought into contact with the supporting object, formed of a non-slip member.

Further, according to the present invention, an information processing system includes an operation device that is held and used by a user and a connection apparatus connected to the operation device. The information processing system further includes: a support part that is provided on the operation device, and is formed to be pressable against a supporting object in a state in which the user is holding the operation device; a pressing detection part for detecting a pressed state in which the support part is pressed against the supporting object; a tilt detection part for detecting a tilt of the operation device; operation information acquisition means for acquiring operation information that is based on information indicating that the pressing detection part has detected the pressed state and information indicating the tilt detected by the tilt detection part; and processing execution means for executing, based on the acquired operation information, processing in accordance with change in the tilt of the operation device in the state in which the support part is pressed against the supporting object.

In the above-mentioned information processing system, the operation information acquisition means includes means for acquiring, as the operation information, information indicating the tilt of the operation device. The operation information acquisition means may acquire, depending on whether or not the pressing detection part has detected the pressed state, the operation information indicating a tilt different from the tilt of the operation device detected by the tilt detection part.

Further, while the pressing detection part is not detecting the pressed state, the operation information acquisition means may acquire, as the operation information, information indicating a tilt of the operation device, which has been detected last in the pressed state.

Further, while the pressing detection part is not detecting the pressed state, the operation information acquisition means may acquire, as the operation information, information indicating a predetermined reference attitude of the operation device.

Further, according to the present invention, an information processing method includes: a pressed state detection step of detecting a pressed state in which an operation device is pressed against a supporting object, the operation device being provided with a support part formed to be pressable against the supporting object while being held by the user; a tilt detection step of detecting a tilt of the operation device; an operation information acquisition step of acquiring operation information that is based on information indicating that the pressed state has been detected in the pressed state detection step and information indicating the tilt detected in the tilt detection step; and a processing execution step of executing, based on the acquired operation information, processing in accordance with change in the tilt of the operation device in the pressed state in which the support part is pressed against the supporting object.

BEST MODE FOR CARRYING OUT THE INVENTION

Hereinbelow, an embodiment of the present invention is described with reference to the drawings.

Figure 1:
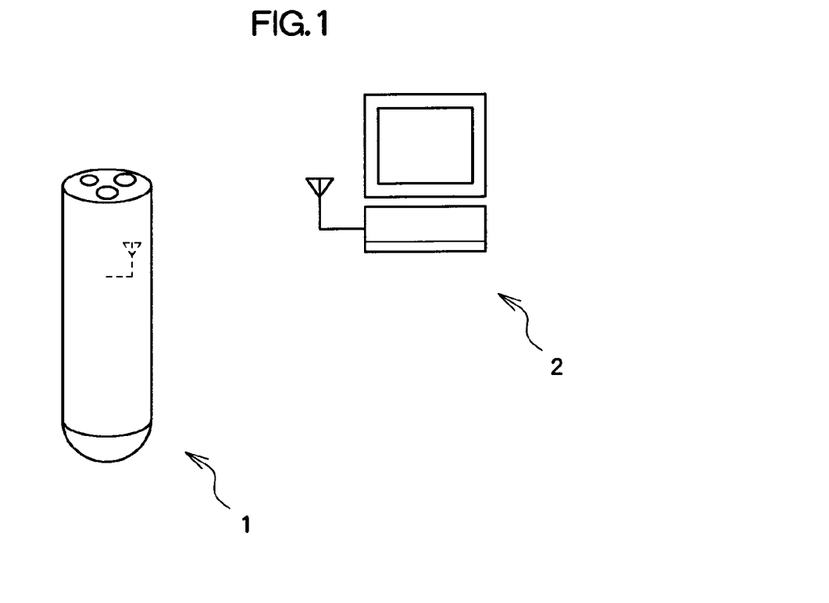
FIG. 1 is a schematic diagram illustrating an example of an information processing system that includes an operation device according to an embodiment of the present invention.

As illustrated in FIG. 1, an information processing system according to this embodiment includes an operation device 1 and an information processing device 2 (connection apparatus), which are communicably connected to each other. In this embodiment, the operation device 1 is so configured as to communicate with the information processing device 2 by wireless, but is not limited thereto and may be connected by wire.

Figure 2:
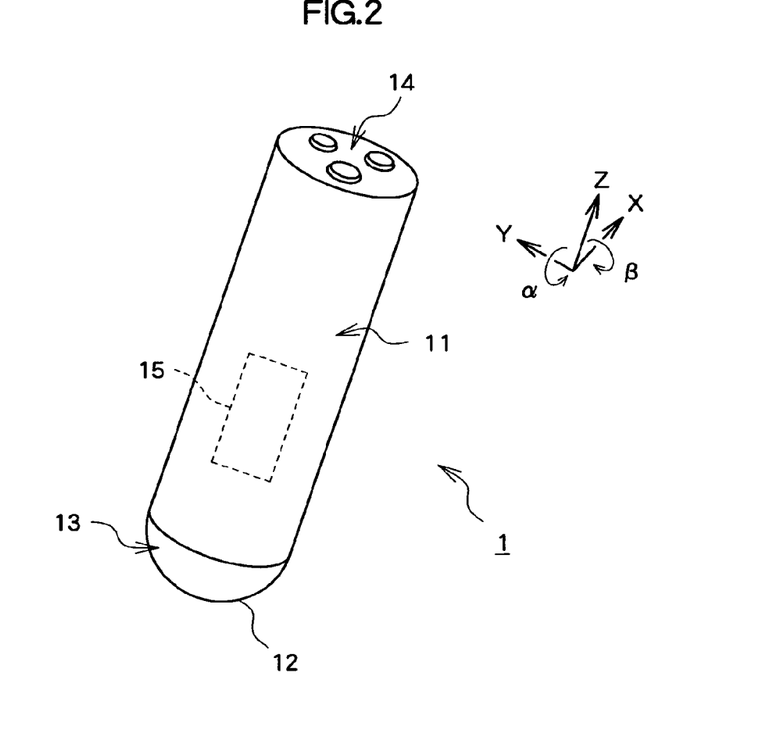
FIG. 2 is an overview illustrating an example of the operation device according to the embodiment of the present invention.

The operation device 1 according to this embodiment is a device that is held and used by a user, and, as illustrated in FIG. 2, is formed substantially in a stick shape. Further, as illustrated in FIG. 2, the operation device includes a grip part 11, a support part 12, a pressing detection part 13, a plurality of buttons 14, and a circuit part 15.

The grip part 11 is a part that the user grips with one hand while using the operation device 1. The grip part 11 maybe provided with a pressure sensor on at least a part of a surface thereof. With this configuration, information output from the pressure sensor is acquired, which allows the information processing device 2 to judge whether or not the operation device 1 is gripped by the user.

Figure 3:
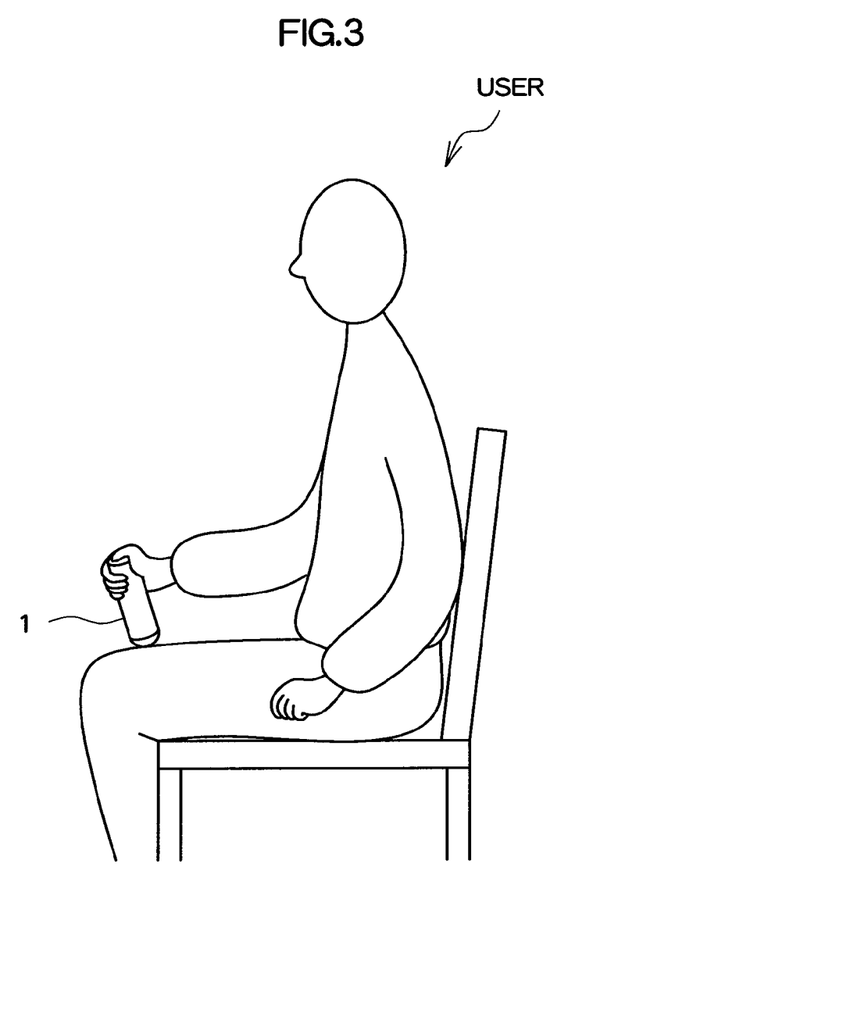
FIG. 3 is an explanatory diagram illustrating an example of a use state of the operation device according to the embodiment of the present invention.

The support part 12 is a part provided on one end of the operation device 1, and is formed to be pressable against a supporting object in a state in which the user is holding the operation device 1. Here, the supporting object may be an arbitrary object. Specifically, the supporting object may be, for example, such an object as a table or a floor, or may be a part of the user s body. FIG. 3 is an explanatory diagram illustrating an example of a use state of the operation device 1 when the user's lap is used as the supporting object. The user uses the operation device 1, pressing the support part 12 against the supporting object as is illustrated.

It should be noted that the surface of the supporting object does not need to be horizontal. Specifically, a plane (for example, wall surface) tilted with respect to a horizontal plane may also be used as the supporting object. Further, as long as the support part 12 can be pressed against the surface of the supporting object, the surface of the supporting object maybe an uneven surface instead of an even surface, or may be a surface that is soft to some extent, such as a human body.

As illustrated in FIG. 2, the support part 12 is formed in a hemispherical shape. With this configuration, the user can easily change the tilt of the operation device 1 while maintaining a state in which the operation device 1 is pressed against the supporting object. It should be noted that the shape of the support part 12 does not have to be a complete hemisphere. Here, description is given of some specific examples of the shape of the support part 12. In the following examples, the surfaces of the support parts 12, which are brought into contact with the supporting object, are all formed to be axisymmetric with respect to a predetermined reference axis (in this case, an axis along the longitudinal direction of the operation device 1; hereinbelow, referred to as Z-axis).

FIGS. 4(a), 4(b), and 4(c) are diagrams schematically illustrating specific examples of shapes of cross sections that are taken parallel to the Z-axis of the support part 12. When the diameter of a cross section perpendicular to the Z-axis is represented by D, in the example of FIG. 4(a), the surface of the support part 12 is formed in a hemispherical shape having a radius R of approximately (½)D with a point C on the Z-axis as the center. In this case, the user can execute the operation of tilting the operation device 1 relatively freely in a pressed state.

In the example of FIG. 4(b), the surface of the support part 12 is formed of two sections represented by a and b in the figure. The section b in the figure corresponds to an area that falls within a range of a predetermined angle θ (for example, 30 degrees) or less with respect to the Z-axis with the point C as the center, whereas the section a in the figure corresponds to an area surrounding the periphery of the section b. Similarly to the case of FIG. 4(a), the section a in the figure is formed in a hemispherical shape having a radius R1 of approximately (½)D with the point C as the center. On the other hand, the section b in the figure is formed of a spherical surface that has the center thereof on the Z-axis and has a radius R2 larger than R1. With this configuration, as long as the tilt of the operation device 1 is almost perpendicular to the surface of the supporting object, the section b in the figure is in contact with the supporting object. When the operation device 1 is tilted to an angle larger than the predetermined angle θ, the section a in the figure comes into contact with the supporting object. Here, the curvature of the section b in the figure is larger than that of the section a in the figure (in other words, relatively closer to a plane). Accordingly, as long as the section b in the figure is in contact with the supporting object, it is easy for the attitude of the operation device 1 to become stable in a state perpendicular to the supporting object.

In the example of FIG. 4(c), similarly to the case of FIG. 4(b), the surface of the support part 12 is formed of two sections, and the section a in the figure has the same shape as in the case of FIG. 4(b). On the other hand, the section b in the figure is a plane. It should be noted that the section b in the figure may be an area having a narrower range (for example, a range of a predetermined angle θ=15° or less with respect to the Z-axis) than in the case of FIG. 4(b). With this configuration, the user can stabilize the operation device 1 in an attitude perpendicular to the surface of the supporting object.

Figure 4:
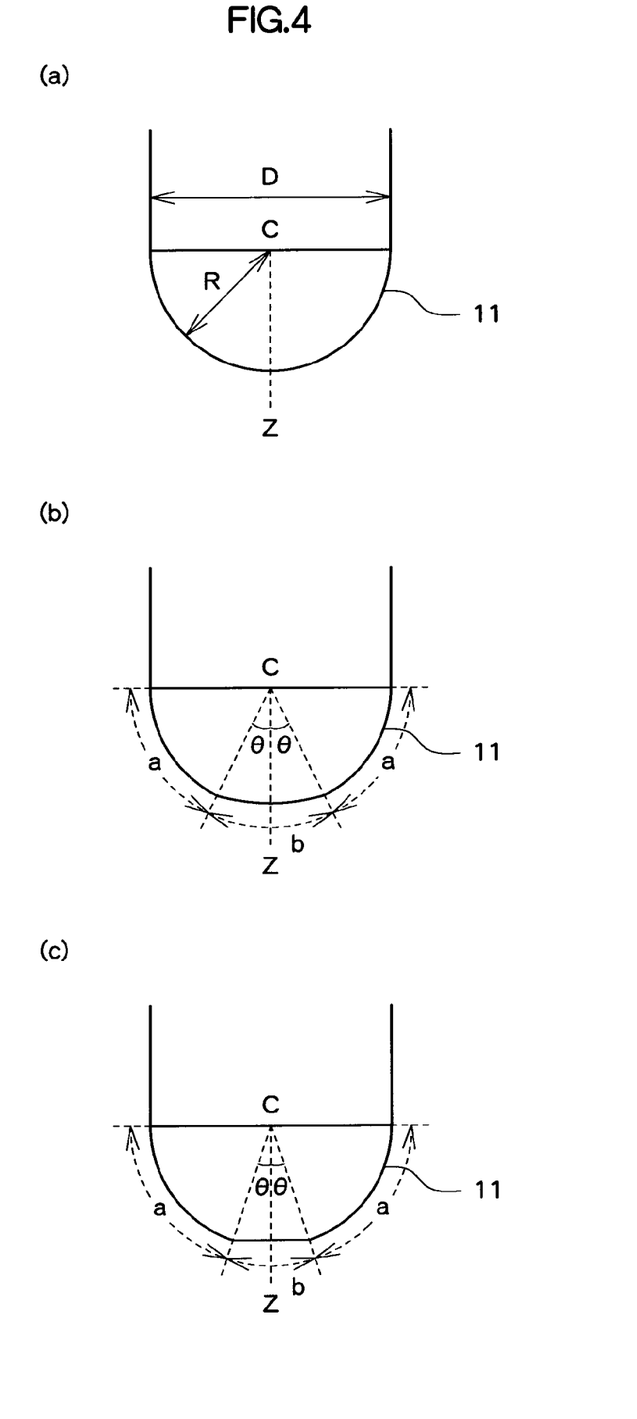
FIG. 4 are diagrams illustrating examples of shapes of a support part of the operation device according to the embodiment of the present invention.

In this way, by forming the curvature of the surface of the support part 12 in such a manner as to change in accordance with the angle with respect to the Z-axis, it is possible to adjust the user's operational feeling obtained when the operation device 1 is tilted. It should be noted that those shapes may be used for different purposes depending on the content of application programs or the like, which are to be executed by the information processing device 2. For example, the support part 12 may be configured in a detachable manner, and one of a plurality of option parts may be selected in accordance with the intended use as a replacement. Further, for a particular use, a stopper may be provided on the surface of the support part 12 so that the operation device 1 cannot be tilted to a predetermined angle or more.

Further, the surface of the support part 12, which is brought into contact with the supporting object, does not have to be axisymmetrical with respect to the Z-axis. For example, regarding the surface of the support part 12, which is brought into contact with the supporting object, the curvature of the surface may be changed between areas located respectively in the X-axis direction and the Y-axis direction illustrated in FIG. 2. As a result, when the user performs the operation of tilting the operation device 1, the tilting in the X-axis direction may be made relatively easier, and the tilting in the Y-axis direction may be made relatively harder.

It should be noted that the surface of the support part 12, which is brought into contact with the supporting object, may be formed of a non-slip member. Specifically, the surface of the support part 12 may be of a material and shape having a coefficient of static friction with respect to a smooth surface, such as a table, of approximately from 0.4 to 0.5 at least. As one example, the support part 12 is covered with an elastic material such as rubber or thermoplastic elastomer. With this configuration, the operation device 1 is made less slippery when the support part 12 is pressed against the supporting object, and therefore the user can stably operate the operation device 1.

The pressing detection part 13 detects a state in which the support part 12 is pressed against the supporting object (hereinbelow, referred to as "pressed state"). Specifically, the operation device 1 according to this embodiment has a structure in which, in the pressed state, the whole of the support part 12 is depressed in the longitudinal direction of the operation device 1. The pressing detection part 13 includes a switch 13a for detecting the state in which the support part 12 is depressed.

Figure 5:
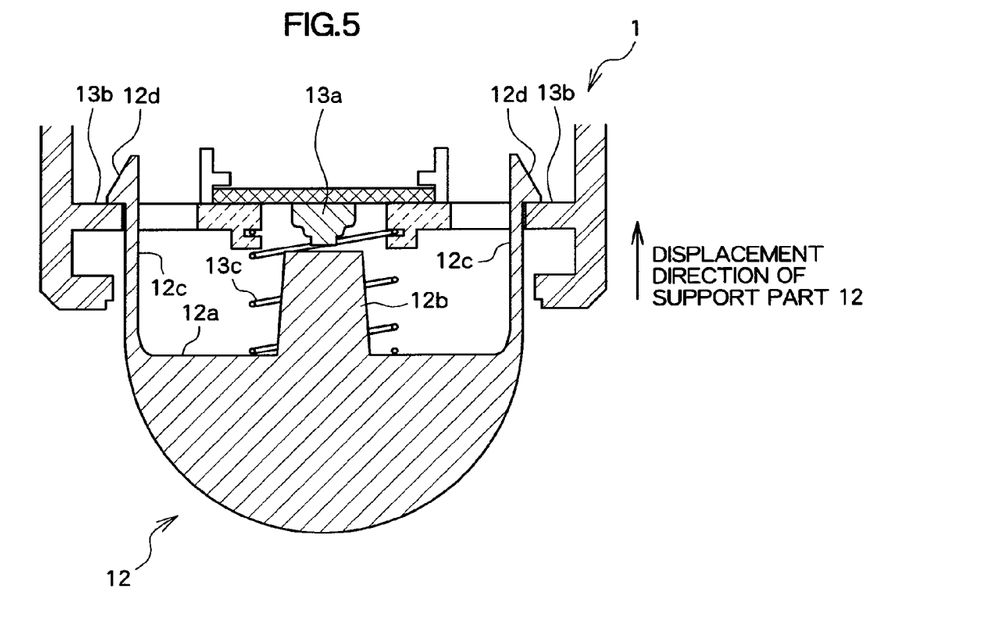
FIG. 5 is a cross section illustrating an example of an inner structure of a pressing detection part of the operation device according to the present invention.

FIG. 5 is a cross section illustrating an example of an inner structure of a part that includes the support part 12 of the operation device 1. As illustrated in FIG. 5, opposite to the surface of the support part 12, which is brought into contact with the supporting object, there is formed a base part 12a having a substantially circular shape, and there is also formed a protruding part 12b that protrudes upward along the Z-axis from the center of the base part 12a. Further, there are provided a plurality of fitting parts 12c that protrude upward along the Z-axis from a peripheral portion of the base part 12a, and, on the tip of the fitting part 12c, there is provided a claw 12d. In FIG. 5, cross sections of two fitting parts 12c among the plurality of fitting parts 12c are illustrated. On the other hand, in the inside of an operation device 1 main body, there is a fitting plate 13b provided perpendicularly to the longitudinal direction thereof. By hooking the claw 12d on the fitting plate 13b, the support part 12 is fitted onto the operation device 1 main body.

The switch 13a is provided at a position facing the protruding part 12b inside the operation device 1. When the surface of the support part 12 is pressed against the supporting object, the support part 12 is displaced in a direction indicated by the arrow of the figure. With this displacement, the protruding part 12b comes into contact with the switch 13a, and the switch 13a is turned on. Here, even in a state in which the operation device 1 is tilted with respect to the surface of the supporting object, as long as the operation device 1 is pressed against the supporting object with a certain degree of force, the support part 12 is depressed in the longitudinal direction of the operation device 1 along the direction of the fitting part 12c.

Further, in the inside of the operation device 1, there is a spring coil 13c disposed substantially coaxially with the protruding part 12b. When the operation device 1 in the pressed state is shifted to a state in which the support part 12 is not pressed against the supporting object (hereinbelow, referred to as "released state"), the spring coil 13c pushes down the base part 12a with the effect of restoring force. As a result of this, the support part 12 that has been depressed in the direction of the arrow of the figure is pushed back to the original position, and the switch 13a is turned off. With the configuration described above, the pressing detection part 13 can detect whether the operation device 1 is in the pressed state or in the released state through the turning-on/turning-off of the switch 13a.

It should be noted that the above-mentioned configuration of the pressing detection part 13 is only an example, and the operation device 1 may employ another configuration to detect the pressed state. For example, the pressing detection part 13 may be configured by a pressure sensor provided on the support part 12. In this case, when the pressure sensor has detected a pressure equal to or larger than a predetermined value, the pressed state can be detected.

The buttons 14 are provided on a surface of the operation device 1, and are each disposed at a position operable with a thumb or a finger in a state in which the user is gripping the grip part 11. Specifically, for example, the buttons 14 are disposed on an end portion of the operation device 1, which is located opposite to the support part 12, or on a side surface of the operation device 1, which is located in the vicinity of the grip part 11. In addition to an operation of changing the tilt of the entire operation device 1 in the pressed state, the user can also perform an operation of depressing those buttons 14.

It should be noted that the operation device 1 may be provided with another operation means, such as a touch panel, instead of or in addition to the buttons 14. To give a specific example, by disposing a touch panel on the end portion of the operation device 1, which is located opposite to the support part 12, the user can perform an operation of touching an arbitrary position on the touch panel with the thumb in a state in which the user is gripping the grip part 11. In this case, the operation device 1 outputs a signal indicating a position that the user has touched on the touch panel, to the information processing device 2. With this configuration, while performing the operation of changing the tilt of the entire operation device 1 in the pressed state, the user can also perform an input operation by touching the touch panel with the thumb.

Figure 6:
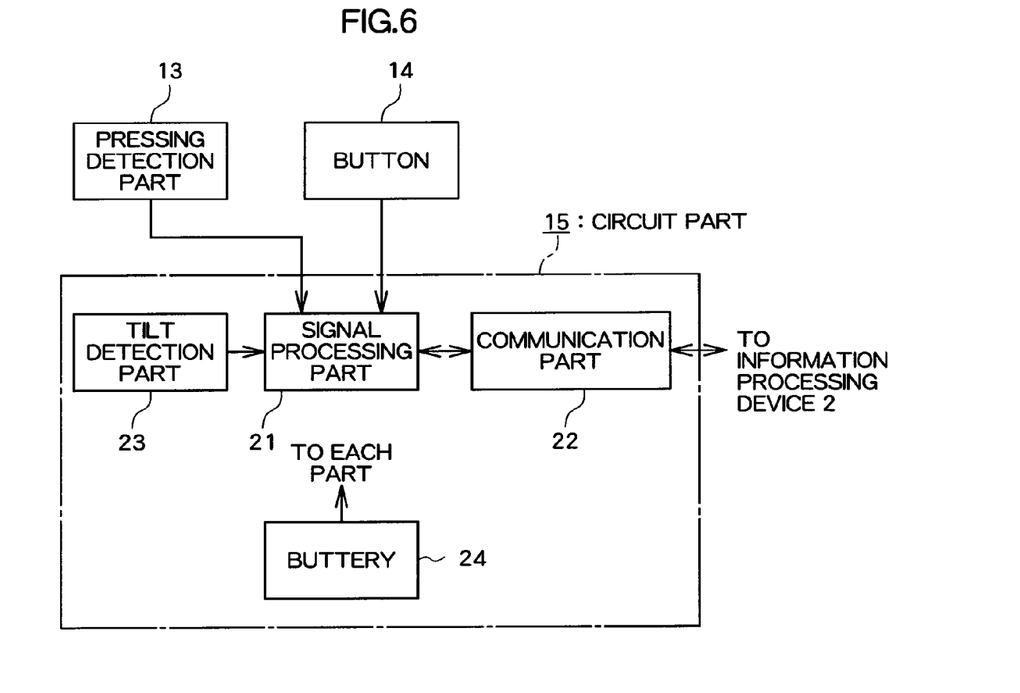
FIG. 6 is a configuration block diagram illustrating a configuration example of a circuit part of the operation device according to the embodiment of the present invention.

As illustrated in FIG. 6, the circuit part 15, which is provided inside the operation device 1, includes a signal processing part 21, a communication part 22, a tilt detection part 23, and a buttery 24.

The signal processing part 21 is a microcomputer or the like, and operates in accordance with a program stored in an integrated storage part. The signal processing part 21 transmits information generated in accordance with a detection result from the pressing detection part 13 or the tilt detection part 23, to the information processing device 2 via the communication part 22. Further, the signal processing part 21 transmits information indicating a content of the user's operation with respect to the buttons 14, to the information processing device 2 via the communication part 22. The communication part 22 is wireless communication means based on, for example, the Bluetooth (registered trademark) standard, and transmits the information output by the signal processing part 21, to the information processing device 2.

The tilt detection part 23 is, for example, an acceleration sensor, and detects the tilt of the operation device 1 to thereby output a signal indicating the detection result to the signal processing part 21. The acceleration sensor in this case may be a three-axis acceleration sensor, which detects an acceleration generated in each of directions of three reference axes. Here, the reference axes are set with respect to the operation device 1 and are perpendicular to one another. For example, as illustrated in FIG. 2, the reference axes are the Z-axis corresponding to the longitudinal direction of the operation device 1 and the X-axis and Y-axis which are perpendicular thereto. In this case, the acceleration sensor outputs three voltage signals that are substantially proportional to the accelerations generated with respect to the respective axes.

Here, the cross section of the operation device 1 according to this embodiment, which is perpendicular to the longitudinal direction thereof, has a substantially circular shape, and hence it is difficult, from the shape of the operation device 1 in itself, to judge in which direction the X-axis and Y-axis, which are reference axes perpendicular to the longitudinal direction, are respectively set. In other words, reference directions that are to serve as references for the tilt detection performed by the tilt detection part 23 are not exactly clear. Accordingly, for example, when the operation device 1 according to this embodiment is tilted with respect to the surface of the supporting object to perform an operation of giving an instruction about the directions, there is a fear that the user might find it difficult to judge which direction corresponds to the forward, backward, rightward, and leftward directions of the operation device 1. In view of this, the operation device 1 may be so formed that the user can identify those reference directions. To give a specific example, the operation device 1 is provided with, on its outer surface, a sign for identifying the reference directions. The sign may be a mark colored with a particular color, or may be one or a plurality of buttons 14 disposed at predetermined positions. Further, the sign may be a protrusion having a predetermined shape. Alternatively, in a case where the operation device 1 is connected to the information processing device 2 by wire, the sign may be a location at which the connection cable is connected.

Further, instead of or in addition to the acceleration sensor, the tilt detection part 23 may be provided with a gyro sensor for detecting the angular rate of a rotation with respect to a predetermined reference axis, a rotary encoder for detecting a rotational amount with respect to the predetermined reference axis, and the like. For example, with the employment of the rotary encoder, the tilt detection part 23 can detect the rotational amount of the operation device 1 about the Z-axis even in a state in which the operation device 1 is standing upright along the vertical direction.

The battery 24 is, for example, a chargeable/dischargeable secondary battery, and supplies power to each part of the operation device 1.

Figure 7:
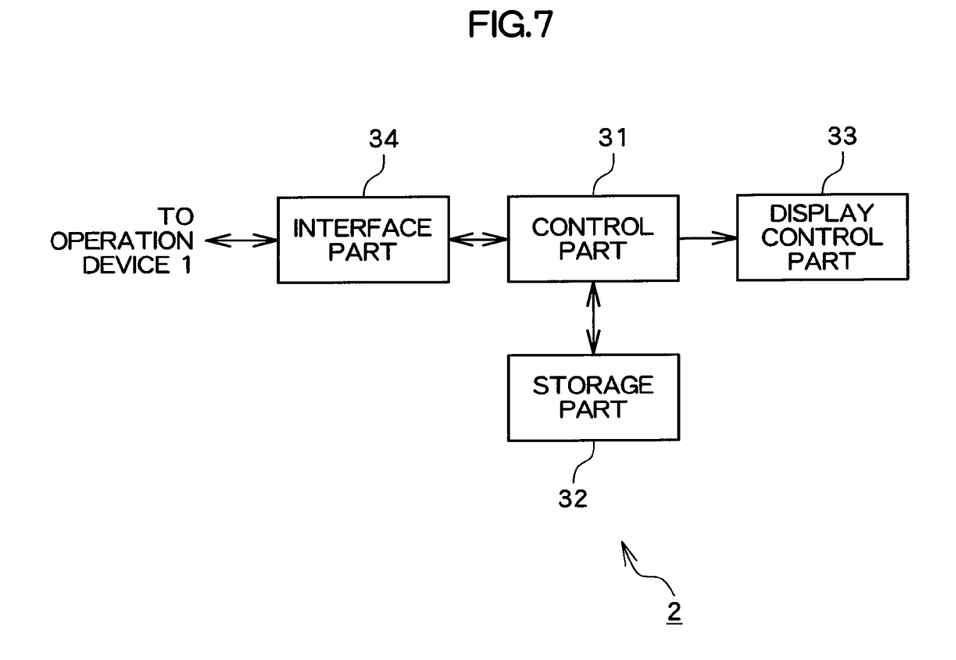
FIG. 7 is a configuration block diagram illustrating a configuration example of an information processing device.

The information processing device 2 is, for example, a home-use game machine, a personal computer, or the like, and as illustrated in FIG. 7 includes a control part 31, a storage part 32, a display control part 33, and an interface part 34.

The control part 31 is, for example, a CPU or the like, and operates in accordance with a program stored in the storage part 32. In this embodiment, the control part 31 executes processing of, for example, a game or an application based on operation information indicating the user's operation content transmitted from the operation device 1 via the interface part 34.

The storage part 32 includes a computer-readable information storage medium, such as memory cells like a RAM or a ROM, or a disk device like a hard disk or a DVD-ROM. The storage part 32 stores a program to be executed by the control part 31. Further, the storage part 32 operates as a work memory for the control part 31.

The display control part 33 is connected to a display device such as a home-use television set. The display control part 33 renders an image in accordance with an instruction from the control part 31, and outputs the rendered image to the display device, thereby causing the display device to display the rendered image.

The interface part 34 includes communication means similar to that of the communication part 22, and is connected to at least one operation device 1. The interface part 34 outputs a signal indicating the user's operation content received from the operation device 1 to the control part 31. Further, the interface part 34 may output a variety of signals for controlling the operation device 1, or the like, in accordance with instructions from the control part 31.

In this embodiment, the user grips the operation device 1 with one hand, and performs a tilt operation of changing the tilt of the operation device 1 in a state in which the support part 12 is pressed against the supporting object. By transmitting information indicating the content of the tilt operation to the information processing device 2, the operation device 1 implements the user's operation with respect to the information processing device 2. The information processing device 2 acquires, through reception from the operation device 1, operation information that is based on information indicating that the pressing detection part 13 has detected the pressed state and information indicating the tilt detected by the tilt detection part 23. Then, based on the acquired operation information, the information processing device 2 executes processing in accordance with the change in the tilt of the operation device 1 in the pressed state.

Here, as illustrated in FIG. 2, when the tilt of the X-axis with respect to the horizontal plane is expressed as a roll angle $\alpha$ and the tilt of the Y-axis with respect to the horizontal plane is expressed as a tilt angle $\beta$, the content of the user's tilt operation in the pressed state is expressed with the roll angle $\alpha$ and the tilt angle $\beta$. Here, the sign of the roll angle $\alpha$ is so determined as to take a positive value when the positive direction of the X-axis is tilted upward from the horizontal plane and take a negative value when the positive direction of the X-axis is tilted downward from the horizontal plane. Similarly, the sign of the tilt angle $\beta$ is so determined as to take a positive value when the positive direction of the Y-axis is tilted upward from the horizontal plane. In this embodiment, the signal processing part 21 executes a predetermined program to thereby calculate the roll angle $\alpha$ and the tilt angle $\beta$ based on information (herein, values indicating accelerations generated with respect to the respective reference axes) indicating the tilt of the operation device 1, which has been detected by the tilt detection part 23. The information processing device 2 acquires the values of the roll angle α and the tilt angle β as the operation information indicating the tilt of the operation device 1, and then, in accordance with the two acquired angle values, executes processing such as changing the attitude of an object disposed in a virtual three-dimensional space.

Figure 8:
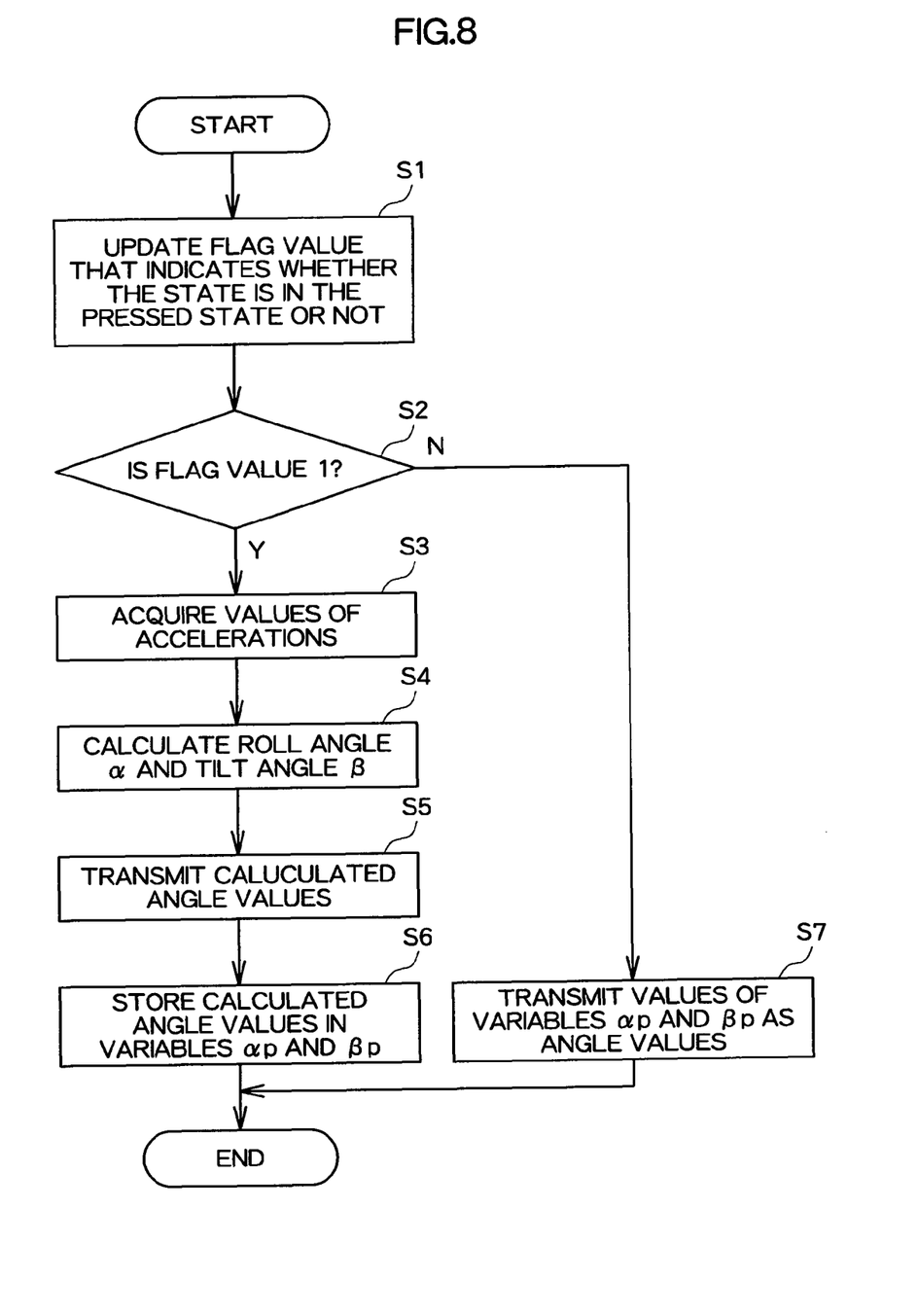
FIG. 8 is a flow chart illustrating an example of processing to be executed by a signal processing part.

Hereinbelow, with reference to a flow chart of FIG. 8, description is given of an example of processing in which, based on information detected by the pressing detection part 13 and the tilt detection part 23, the operation device 1 calculates the operation information indicating the content of the tilt operation, which is to be transmitted to the information processing device 2. It should be noted that this processing is executed repeatedly, for example, at predetermined intervals.

First, based on the information detected by the pressing detection part 13, the signal processing part 21 updates a flag value that indicates whether or not the operation device 1 is in the pressed state (S1). For example, if the pressing detection part 13 outputs a signal indicating the pressed state, the signal processing part 21 updates the flag value to 1. Conversely, if the pressing detection part 13 outputs a signal indicating the released state, the signal processing part 21 updates the flag value to 0.

The subsequent processing branches based on whether the flag value is 1 or 0 (S2). When the flag value is 1, the signal processing part 21 acquires the values of accelerations with respect to the respective reference axes, which have been detected by the tilt detection part 23 (S3). Here, the accelerations with respect to the X-axis, the Y-axis, and the Z-axis are denoted by Ax, Ay, and Az, respectively.

Next, based on the acceleration values acquired in S3, the signal processing part 21 calculates the roll angle α and the tilt angle β, which represent a current attitude of the operation device 1 (S4).

Here, description is given of a method of calculating α and β. When the accelerations of the X-axis and the Y-axis are the results obtained from the components of the gravitational acceleration in the respective axial directions, the angle values α and β can be respectively calculated using the following expressions.

$$\begin{cases} \alpha = \sin^{-1}\left(\dfrac{Ax}{g}\right) \times \dfrac{180}{\pi} \\ \beta = \sin^{-1}\left(\dfrac{Ay}{g}\right) \times \dfrac{180}{\pi} \end{cases}$$ [Expression 1]

In those expressions, α and β are each calculated as a value expressed in degrees. Here, g represents a value of the gravitational acceleration, and may employ a predetermined constant or may be calculated using the following expression.

$$g = \sqrt{Ax^2 + Ay^2 + Az^2}$$ [Expression 2]

Incidentally, in the case of a low-power consumption microcomputer or the like, it is sometimes desired to make the amount of computation to be executed smaller. In view of this, the signal processing part 21 may employ the values of Ax and Ay without any conversion, as approximate values of α and β.

Further, the signal processing part 21 transmits the values of α and β calculated in S4 to the information processing device 2 via the communication part 22 (S5). After that, the values of variables αp and βp, which are set in advance, are updated with the values of α and β calculated in S4, respectively (S6). Here, αp and βp are variables indicating the values of α and β that have been detected last in the pressed state. As has been described above, when it is judged, in the branching processing in S2, that the operation device 1 is in the pressed state, the values of αp and βp are updated to the latest values of α and β.

On the other hand, when the flag value is 0 in the branching processing in S2 (in other words, when the operation device 1 is in the released state), regardless of the acceleration values detected by the tilt detection part 23, the signal processing part 21 transmits the values of the variables αp and βp, which have been updated in S6, as the values of the roll angle α and the tilt angle β, respectively, to the information processing device 2 via the communication part 22 (S7).

With the processing described above, during the released state, the operation device 1 outputs values indicating the last tilt of the operation device 1 in the pressed state as the values indicating the tilt of the operation device 1. Specifically, during the released state, the operation device 1 continues to output values indicating the tilt of the operation device 1, which has been obtained immediately before the pressed state is shifted to the released state. With this configuration, even if the user changes the direction of the operation device 1 in the released state, the information processing device 2 can execute the same processing as in the case in which the operation device 1 is kept tilted to a certain angle. Owing to this, for example, if the user temporarily stops pressing the operation device 1 against the supporting object in the middle of the operation to change the way of holding the operation device 1, the information processing device 2 can continue the processing, assuming that the operation device 1 is kept at the same attitude.

Here, in the processing described above, when the flag value is 0 in the branching processing in S2, the signal processing part 21 may output, instead of the values of the variables αp and βp, predetermined values indicating a predetermined tilt (reference attitude) of the operation device 1. For example, in the above-mentioned processing of S7, the signal processing part 21 may transmit 0 as each of the values of α and β, to the information processing device 2. In this case, the state of α=0 and β=0 corresponds to a state in which the operation device 1 is standing upright along the vertical direction with respect to the horizontal plane. With this configuration, while the operation device 1 is in the released state, the information processing device 2 can execute the processing, assuming that the operation device 1 is at the reference attitude.

As described above, upon outputting the operation information indicating the tilt of the operation device 1, the signal processing part 21 may output information indicating a tilt of the operation device 1 different from the tilt detected by the tilt detection part 23, depending on whether or not the pressing detection part 13 has detected the pressed state. With this configuration, in accordance with whether the operation device 1 is in the pressed state or in the released state, it is possible to change the content of the processing to be executed by the information processing device 2.

Further, in the above description, the signal processing part 21 determines the roll angle α and the tilt angle β based on the information detected by the pressing detection part 13 and the tilt detection part 23, but part or the whole of the processing may be executed by the control part 31 of the information processing device 2. For example, by executing a device driver program corresponding to the operation device 1, the information processing device 2 may calculate the roll angle α and the tilt angle β based on the information indicating the tilt of the operation device 1, which has been detected by the tilt detection part 23.

With the operation device 1 described above according to this embodiment, the user performs the operation of tilting the operation device 1 while pressing the support part 12 of the operation device 1 against the supporting object, to thereby perform stable operation input without taking up a lot of space. Further, due to the pressing detection part 13 detecting the pressed state, the information processing device 2 according to this embodiment can execute processing in accordance with an actual tilt of the operation device 1 when the user is consciously performing the tilt operation. During a period in which it is judged that the user is not consciously performing the tilt operation, the information processing device 2 according to this embodiment can execute processing in accordance with corrected information on the tilt of the operation device 1.

It should be noted that the present invention is not limited to the above-mentioned embodiment, and various modifications can be made. For example, in the above description, the angle values indicating the tilts of the X-axis and Y-axis with respect to the horizontal plane are used in the processing of the information processing device 2 as the operation information indicating the content of the operation of tilting the operation device 1. However, the present invention is not limited thereto, and various values may be used as the operation information. For example, in a case where the surface of the supporting object is tilted with respect to the horizontal plane, instead of the tilt with respect to the horizontal plane, an angle value indicating the tilt of the operation device 1 with respect to the surface of the supporting object may be used as the operation information. To give a specific example, the operation device 1 acquires information indicating the tilt of the operation device 1, which is obtained immediately after the released state is shifted to the pressed state, as the angle values corresponding to the reference attitude of the operation device 1. In this case, during the pressed state, the signal processing part 21 or the control part 31 calculates, as the operation information indicating the content of the user's tilt operation, a difference value between the angle value indicating the tilt of the operation device 1 with respect to the horizontal plane and the already-acquired angle value corresponding to the reference attitude of the operation device 1. With this configuration, it becomes possible to evaluate the tilt of the operation device 1, using, as the reference, the attitude obtained when the operation device 1 is first pressed against the supporting object.

Further, the reference axes, which serve as the references at the time of determining by calculation the operation information indicating the content of the tilt operation, are not limited to fixed ones that are set in the operation device 1 in advance, and may be determined in accordance with a holding state of the operation device 1. For example, in a case where it is possible to detect the positions of the fingers at the time when the user grips the operation device 1, using the above-mentioned pressure sensor or the like which is provided on the surface of the grip part 11, the reference axes for evaluating the tilt may be determined in accordance with the detected positions of the fingers. With this configuration, the above-mentioned sign to indicate the reference direction serving as the reference for the tilt detection performed by the tilt detection part 23 may not need to be provided, and the user can hold and use the operation device 1 without paying particular attention to the reference axes of the operation device 1.

Figure 9:
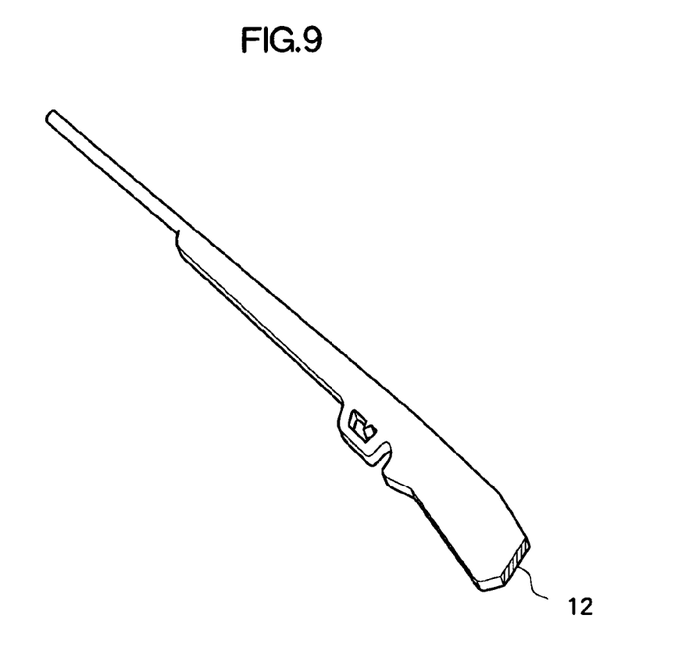
FIG. 9 is an explanatory diagram illustrating another example of the shape of the operation device according to the embodiment of the present invention.

Further, the operation device 1 according to the embodiment of the present invention is not limited to the shape illustrated in FIG. 2, and may have various shapes. For example, as illustrated in FIG. 9, the operation device 1 may have a shape resembling a firearm. In the example of this figure, the hatched portion of the figure serves as the support part 12. The user presses this support part 12 against, for example, a part of their own shoulder to thereby perform the operation of changing the direction of the operation device 1. With this configuration, the information processing device 2 can only execute the processing in accordance with the direction of the operation device 1 when the user holds the operation device 1 like a firearm.

Figure 10:
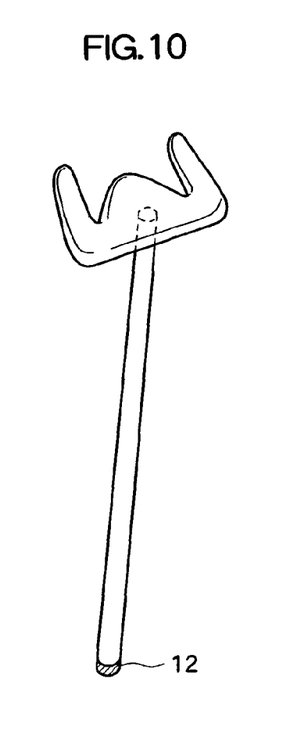
FIG. 10 is an explanatory diagram illustrating yet another example of the shape of the operation device according to the embodiment of the present invention.

Further, the operation device 1 may have a shape resembling a steering wheel as illustrated in FIG. 10. In the example of the figure, for example, the user sits on a chair, and in a state in which the support part 12 indicated by the hatching of the figure is pressed against a floor or the like, performs an operation of rotating the operation device 1 or other operations.

Figure 11:
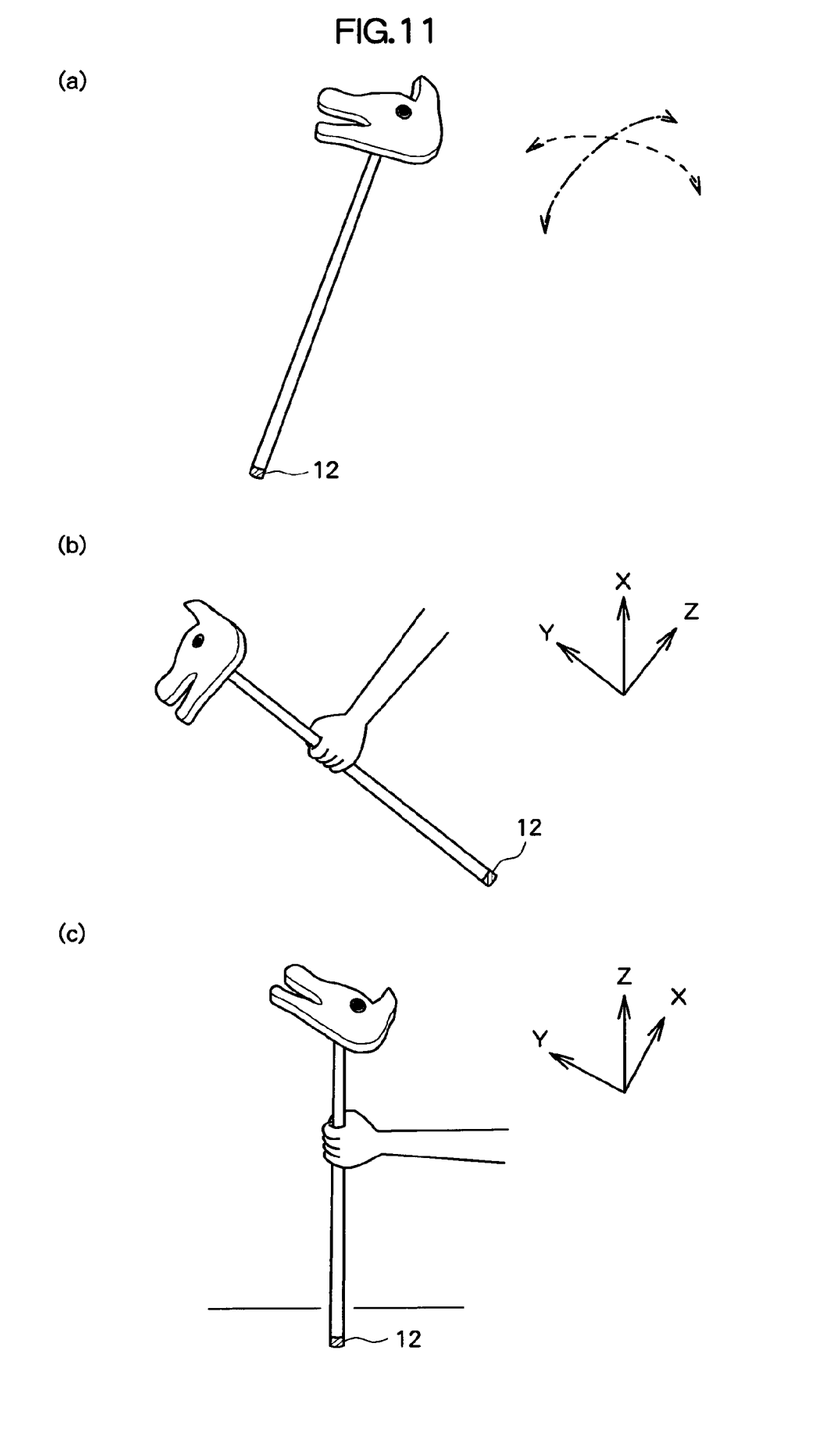
FIG. 11 are explanatory diagrams illustrating yet another example of the shape of the operation device according to the embodiment of the present invention.

Alternatively, the operation device 1 may have a shape resembling a cane illustrated in FIG. 11(*a*). In the example of this figure, for example, in a state in which the support part 12 indicated by the hatching in the figure is pressed against a floor or the like, the information processing device 2 may execute the processing in accordance with a tilt in a direction indicated by the dashed line in the figure. While the operation device 1 is in the released state, the information processing device 2 may execute the processing in accordance with a tilt in a direction indicated by the alternate long and short dash line in the figure.

Further, the operation device 1 illustrated in FIG. 11(*a*) is expected to vary drastically in its attitude between a case in which the user holds the operation device 1 with the hand alone and a case in which the user uses the operation device 1 with the support part 12 pressed against the floor. Specifically, when used in the released state, the operation device 1 is naturally held in a substantially horizontal attitude as illustrated in FIG. 11(*b*), whereas when used in the pressed state, the operation device 1 is naturally held in a substantially vertical attitude as illustrated in FIG. 11(*c*). Accordingly, the reference axes that serve as the references at the time of determining by calculation the operation information indicating the content of the tilt operation may be changed in accordance with the detection result from the pressing detection part 13. For example, when the operation device 1 is in the released state, the reference axes are set such that the longitudinal direction of the operation device 1 coincides with the Y-axis as illustrated in FIG. 11(*b*). On the other hand, when the operation device 1 is in the pressed state, the reference axes are set such that the longitudinal direction of the operation device 1 coincides with the Z-axis as illustrated in FIG. 11(*c*). Then, the information processing device 2 judges whether the operation device 1 is in the pressed state or in the released state, and then acquires, as the operation information, changes in the tilts of the respective reference axes, which are determined in accordance with each of the states. With this configuration, in both cases of using the operation device 1 in the pressed state and in the released state, it becomes possible for the user to perform, in a natural posture, the tilt operation having a sufficient range. In this manner, when information indicates the same tilt of the operation device 1, the processing to be executed by the information processing device 2 is changed between the case of the pressed state and the case of the released state, thereby making it possible to increase variations of the operation that is performed by using the operation device 1.

The invention claimed is:

1. An operation device that is held and used by a user, comprising:
   a state detection part for detecting a first state and a second state of the operation device;

a tilt detection part for detecting a tilt of the operation device; and an output part for outputting information indicating the state detected by the state detection part and information indicating the tilt detected by the tilt detection part, wherein the user implements operation with respect to an operation target device by changing the tilt of the operation device, the operation being expressed using operation information according to information which is output by the output part in response to the user's motion to change the tilt of the operation device, the operation information being information indicating a tilt detected by the tilt detection part when the state detection part has detected the first state, and being information indicating a tilt different from the tilt of the operation device detected by the tilt detection part when the state detection part has detected the second state.

2. An operation device according to claim 1, wherein the operation device is formed in a manner that enables identification of a reference direction, the reference direction serving as a reference for the tilt detection performed by the tilt detection part.

3. An operation device according to claim 1,
wherein the state detection part comprises a switch,
wherein the first state is a state in which the switch is turned on, and
wherein the second state is a state in which the switch is turned off.

4. An operation device according to claim 1, further comprising:
a support part formed to be pressable against a supporting object in a state in which the user is holding the operation device;
wherein the state detection part detects a state in which the support part is pressed against the supporting object as the first state, and a state in which the support part is not pressed against the supporting object as the second state.

5. An operation device according to claim 4, wherein the support part is formed in a hemispherical shape.

6. An operation device according to claim 5, wherein the support part is axisymmetric with respect to a predetermined reference axis, and is formed to have a curvature of a surface thereof that varies with an angle with respect to the reference axis.

7. An operation device according to claim 4, wherein the support part has a surface, which is brought into contact with the supporting object, formed of a non-slip member.

8. An information processing system comprising an operation device that is held and used by a user, wherein the information processing system further comprises:
a state detection part for detecting a first state and a second state of the operation device;
a tilt detection part for detecting a tilt of the operation device;
operation information acquisition part for acquiring operation information that is based on information indicating the state detected by the state detection part and information indicating the tilt detected by the tilt detection part; and
a processing execution part for executing, based on the acquired operation information, processing in accordance with change in the tilt of the operation device
wherein the operation information acquisition part acquires, when the state detection part has detected the first state, information indicating the tilt of the operation device as the operation information, and acquires, when the state detection part has detected the second state, the operation information indicating a tilt different from the tilt of the operation device detected by the tilt detection part as the operation information.

9. An information processing system according to claim 8, wherein, while the state detection part is detecting the second state, the operation information acquisition part acquires, as the operation information, information indicating a tilt of the operation device detected last in the first state.

10. An information processing system according to claim 8, wherein, while the state detection part is detecting the second state, the operation information acquisition part acquires, as the operation information, information indicating a predetermined reference attitude of the operation device.

11. An information processing system according to claim 8, wherein the information processing system further comprises:
a support part that is provided on the operation device, and is formed to be pressable against a supporting object in a state in which the user is holding the operation device,
wherein the state detection part detects a state in which the support part is pressed against the supporting object as the first state, and a state in which the support part is not pressed against the supporting object as the second state.

12. An information processing method, comprising:
a state detection step of detecting a first state and a second state of an operation device;
a tilt detection step of detecting a tilt of the operation device;
an operation information acquisition step of acquiring operation information that is based on information indicating the state detected in the state detection step and information indicating the tilt detected in the tilt detection step; and
a processing execution step of executing, based on the acquired operation information, processing in accordance with change in the tilt of the operation device
wherein the operation information acquisition step is for acquiring, when the first state has been detected in the state detection step, information indicating the tilt of the operation device as the operation information, and acquiring, when the second state has been detected in the state detection step, the operation information indicating a tilt different from the tilt of the operation device detected in the tilt detection step as the operation information.

* * * * *

UNITED STATES PATENT AND TRADEMARK OFFICE
CERTIFICATE OF CORRECTION

| | |
|---|---|
| PATENT NO. | : 8,416,190 B2 |
| APPLICATION NO. | : 12/526255 |
| DATED | : April 9, 2013 |
| INVENTOR(S) | : Hirata et al. |

It is certified that error appears in the above-identified patent and that said Letters Patent is hereby corrected as shown below:

In the Claims:

Column 14, Line 6, Claim 8, delete "device" and insert --device,--, therefor.

Column 14, Line 47, Claim 12, delete "device" and insert --device,--, therefor.

Signed and Sealed this
Thirteenth Day of August, 2013

Teresa Stanek Rea
*Acting Director of the United States Patent and Trademark Office*